US012739009B2

(12) United States Patent
Kochiev et al.

(10) Patent No.: US 12,739,009 B2
(45) Date of Patent: Sep. 15, 2026

(54) SYSTEM AND METHODS OF ADAPTIVE BEAMFORMING

(71) Applicant: T-Mobile USA, Inc., Bellevue, WA (US)

(72) Inventors: Timur Kochiev, Irvine, CA (US); Relin Thomas, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 82 days.

(21) Appl. No.: 18/980,927

(22) Filed: Dec. 13, 2024

(65) Prior Publication Data

US 2026/0172098 A1 Jun. 18, 2026

(51) Int. Cl.
*H04B 7/06* (2006.01)
*H04W 8/18* (2009.01)
*H04W 72/56* (2023.01)

(52) U.S. Cl.
CPC ............ *H04B 7/0695* (2013.01); *H04W 8/18* (2013.01); *H04W 72/56* (2023.01)

(58) Field of Classification Search
CPC ....... H04B 7/0695; H04W 72/56; H04W 8/18
See application file for complete search history.

(56) References Cited

U.S. PATENT DOCUMENTS 6,349,217 B1 2/2002 Honcharenko et al.
7,627,348 B2 12/2009 Lysejko et al.
9,125,230 B2 * 9/2015 Wu ........................ H04W 68/02
9,936,397 B2 4/2018 Campos et al.
10,382,105 B2 8/2019 Hor-lao et al.
10,720,978 B1 7/2020 Sun et al.
10,973,062 B2 4/2021 Sadhu et al.
11,006,385 B2 * 5/2021 Yu .......................... H04W 68/02
11,128,352 B2 9/2021 Lorca Hernando et al.
11,277,180 B1 3/2022 Raghavan et al.
11,438,050 B2 * 9/2022 Sakuma ................. H04B 7/088
11,533,638 B2 12/2022 Ho et al.
11,611,381 B2 3/2023 Zhu et al.
11,627,470 B1 * 4/2023 Gronstad ............. H04W 16/10
370/329

(Continued)

FOREIGN PATENT DOCUMENTS

CN 111164909 B 9/2023
EP 3845023 A1 7/2021

(Continued)

*Primary Examiner* — Jaison Joseph
(74) *Attorney, Agent, or Firm* — Ashurst Perkins Coie US LLP

(57) ABSTRACT

The system receives activity data generated from a wireless device connected to a base station of a telecommunication network. The activity data includes an account status of a subscriber, subscriber traffic type, or service type. The account status of the subscriber is classified as a premium subscriber or a standard subscriber. The system causes the activity data to be inputted into a machine learning (ML) model. The system receives, as an output from the ML model, a beamforming plan for the base station. The beamforming plan includes a direction to transmit a beam, a time period to transmit the beam, and at least one network slice on which to transmit the beam. The system generates the beam on the at least one network slice in accordance with the beamforming plan.

20 Claims, 6 Drawing Sheets

(56) References Cited

U.S. PATENT DOCUMENTS

| | | | |
|---|---|---|---|
| 11,757,508 | B1 | 9/2023 | Raghavan et al. |
| 11,831,556 | B2 | 11/2023 | Young et al. |
| 11,909,498 | B2 | 2/2024 | Fazili et al. |
| 12,051,913 | B2 | 7/2024 | Paduvalli et al. |
| 12,088,371 | B2 | 9/2024 | Raghavan et al. |
| 12,089,064 | B2 | 9/2024 | Lu et al. |
| 12,143,941 | B1 | 11/2024 | Duong |
| 2005/0272472 | A1 | 12/2005 | Goldberg et al. |
| 2010/0075687 | A1 | 3/2010 | Chayat |
| 2014/0378172 | A1* | 12/2014 | Lim ...................... H04W 68/02 455/458 |
| 2020/0236575 | A1* | 7/2020 | Yang ..................... H04W 48/16 |
| 2021/0297128 | A1 | 9/2021 | Badic et al. |
| 2022/0007207 | A1 | 1/2022 | Raghavan et al. |
| 2022/0046528 | A1 | 2/2022 | Yang et al. |
| 2022/0173820 | A1 | 6/2022 | Berglund et al. |
| 2023/0131254 | A1* | 4/2023 | Karakkad Kesavan Namboodiri ........ H04W 72/046 370/252 |
| 2023/0254837 | A1 | 8/2023 | Raghavan et al. |
| 2023/0318690 | A1 | 10/2023 | Kurras et al. |
| 2024/0163686 | A1 | 5/2024 | Naik et al. |
| 2024/0187871 | A1 | 6/2024 | Raghavan et al. |
| 2024/0244488 | A1 | 7/2024 | Jagannathan et al. |
| 2024/0275605 | A1 | 8/2024 | Cai et al. |
| 2024/0372788 | A1 | 11/2024 | Glenn et al. |
| 2024/0373404 | A1 | 11/2024 | Glenn et al. |
| 2025/0365053 | A1* | 11/2025 | Kumar ................. H04B 7/0695 |

FOREIGN PATENT DOCUMENTS

| | | | |
|---|---|---|---|
| EP | 4432719 | A1 | 9/2024 |
| WO | 2019190368 | A1 | 10/2019 |
| WO | 2021112592 | A1 | 6/2021 |
| WO | 2021160689 | A1 | 8/2021 |

* cited by examiner

SYSTEM AND METHODS OF ADAPTIVE BEAMFORMING

BACKGROUND

Beamforming or spatial filtering is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array.

BRIEF DESCRIPTION OF THE DRAWINGS

Detailed descriptions of implementations of the present invention will be described and explained through the use of the accompanying drawings.

Figure 1:
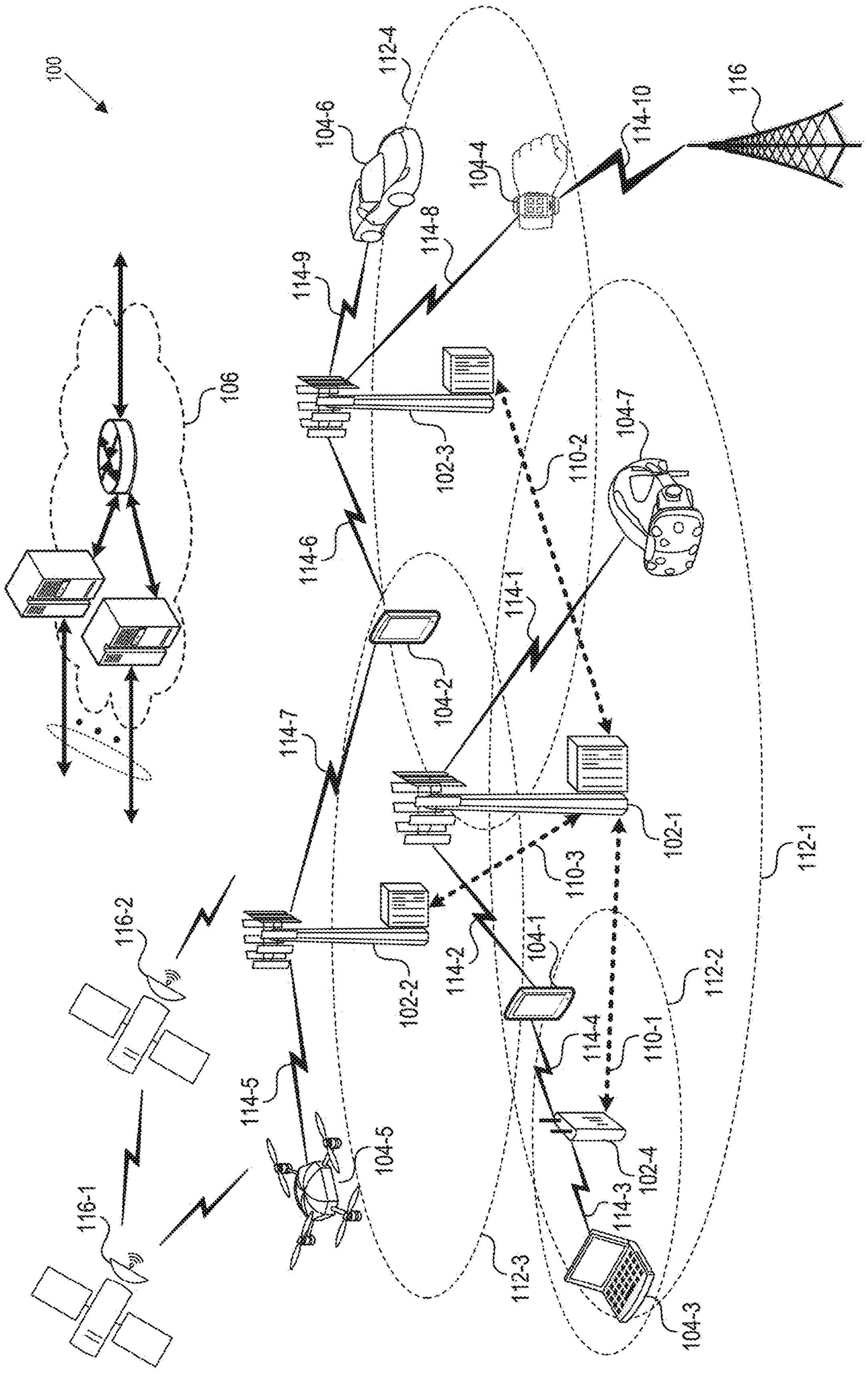
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system relates to slice-aware adaptive beamforming for telecommunication networks. Base stations in a telecommunication network typically transmit a wireless signal in all directions over multiple network slices. Network slicing is a telecommunications configuration that enables multiple networks (virtualized and independent) to be created on top of a common physical infrastructure. Each "network slice" or portion of the network can be allocated based on the specific needs of the application, use case, or customer. Transmitting the signal in all directions enables a wireless device to access the telecommunication network and a given network slice through the base station from any point in range of the base station. The base station often wastes resources by transmitting the wireless signal on a given network slice in a direction that contains no wireless devices. Beamforming can direct the wireless signal as a beam in a specific direction for a specific network slice, such as directing a main lobe of the beam toward a specific wireless device. A beam, therefore, is formed from transmitted wireless signals that are directionally focused toward a common area or point. Beamforming can improve the signal-to-interference-and-noise ratio (SINR), increase data rates, reduce interference, and reduce power consumption for the wireless devices in range of the beam. Beamforming, though, is computationally expensive, and it is difficult to predict and determine when and where to direct the main lobe, especially when a wireless device is not stationary. Additionally, beamforming results in sidelobes that waste energy and may cause interference with the main lobe, reducing the benefits of beamforming.

The disclosed system combines beamforming with a machine learning (ML) model to generate beams for specific network slices based on the subscriber status of the wireless device connected to the telecommunication network as defined in a service-level agreement associated with the subscriber. Using beamforming methods combined with an ML model reduces strain on the telecommunication network while increasing subscriber experience by, for example, increasing data speeds and lowering latency for the subscriber. The system can use zero-forcing beamforming methods to reduce interference by suppressing the side lobes and beam steering the main lobe toward a desired wireless device, such as a wireless device associated with a premium subscriber of the telecommunication network who is connected to a premium network slice of the telecommunication network. A premium subscriber is a subscriber who subscribes to a premium network slice that can supply higher data speeds and lower latency compared to standard network slices.

The system can direct a beam on a premium network slice toward the wireless device of a premium subscriber while simultaneously directing a second beam on a different network slice toward a wireless device of a standard or second premium subscriber. Each network slice can supply different levels of telecommunication services using beamforming methods. Each beam has a main lobe and side lobes. The beam directed toward the premium subscriber on a premium network slice can lower the efficiency of the beam on a standard network slice directed at the standard subscriber while still meeting the traffic demands of the standard subscriber and lowering the SNIR of the standard subscriber. The ML model determines the direction in which a beam should be directed and when the beam should be transmitted. The ML model determines the parameters for the network slice, such as when and where to direct the beam, using traffic demand and service types received from the base station. Thus, the telecommunication network can use historical demand and usage to dynamically control when and where a beam should be directed. This reduces the energy consumption and the emission of greenhouse gases produced by the telecommunication network by preventing the telecommunication network from wasting resources by transmitting wireless signals to unneeded areas.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
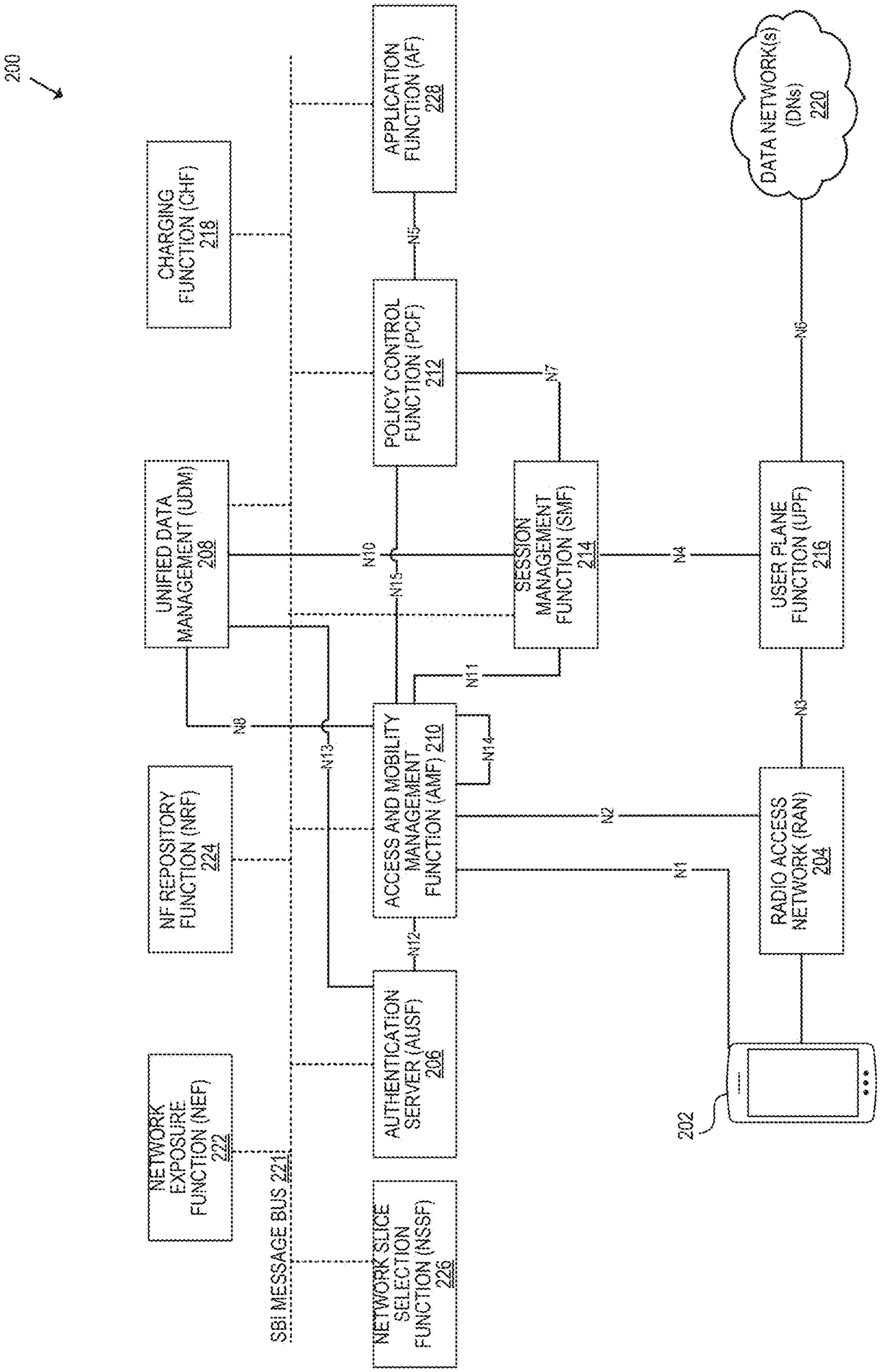
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Adaptive Beamforming

Figure 3:
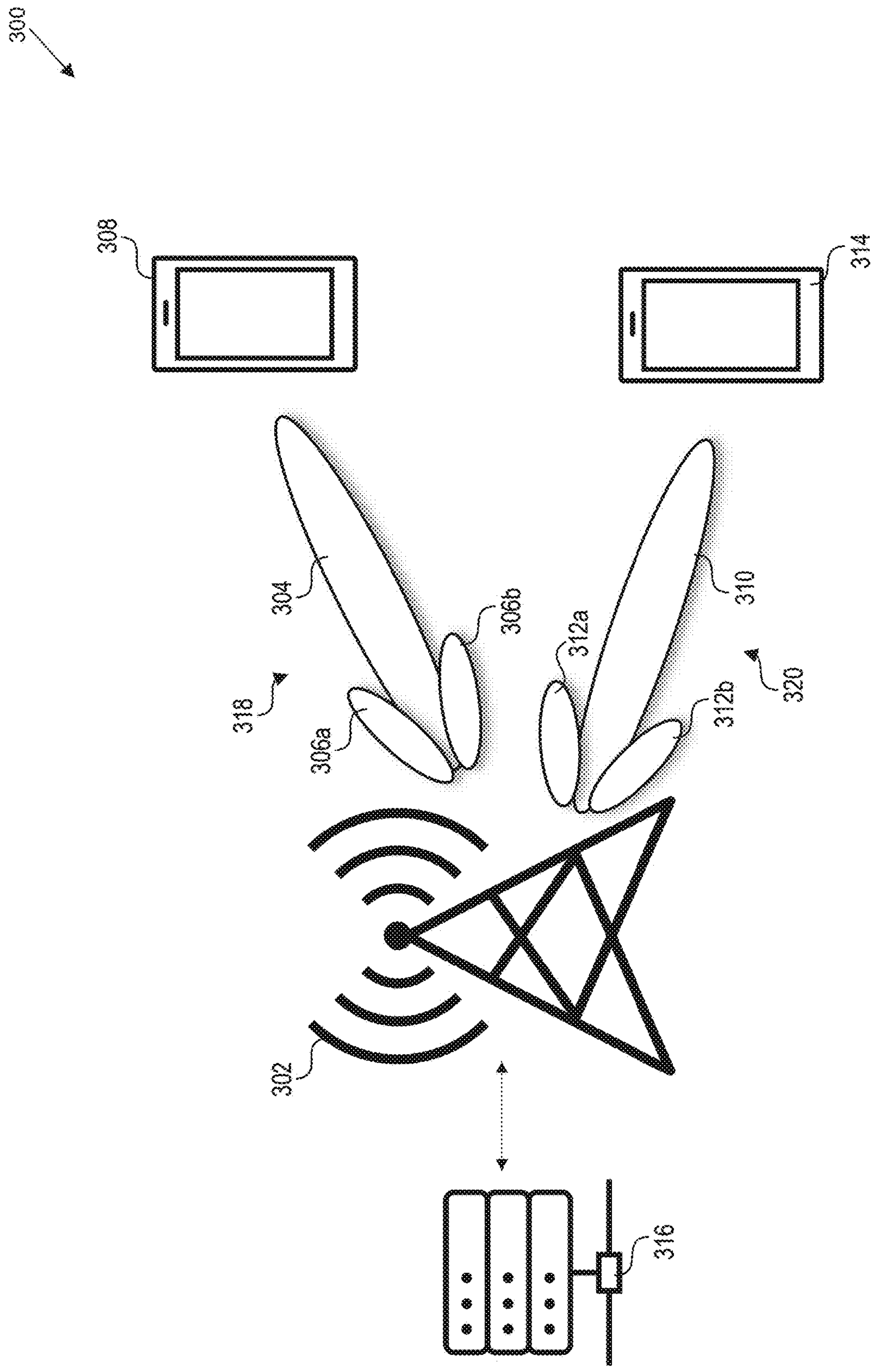
FIG. 3 is a block diagram that illustrates an embodiment of the system.

FIG. 3 illustrates an embodiment 300 of the disclosed system. A base station 302 of a telecommunication network provides telecommunication services to a first wireless device 308 and a second wireless device 314 using different network slices. The first wireless device 308 is associated with a premium subscriber of the telecommunication network. A premium subscriber to the telecommunication network can pay extra fees and costs for a higher level of service compared to the standard subscriber. For example, a higher level of service can include more bandwidth, faster bandwidth, lower latency, etc. In some embodiments, premium subscribers are defined by the type of network traffic they generate. For example, network traffic generated by a wireless device performing artificial reality or virtual reality tasks that require high data speeds and low latency can be defined as a premium subscriber. The second wireless device 314 is associated with a standard subscriber of the telecommunication network. A standard subscriber can include subscribers who pay for a standard amount of bandwidth and bandwidth speeds (e.g., a lower amount or speed when compared to a premium subscriber) or subscribers to different telecommunication networks roaming on the telecommunication network. In some embodiments, standard subscribers are defined by the type of network traffic they generate. For example, network traffic generated by a wireless device streaming online videos or using social media can be defined as a standard subscriber. The system receives real-time activity data from the first wireless device 308 and the second wireless device 314. The activity data includes each wireless device's interactions with the telecommunication network, such as the type of network traffic generated by the wireless device, the services used by the wireless device, the account status of the subscriber associated with the wireless device (e.g., a premium or standard subscriber), and/or location data of the wireless device. The location data can be generated from the wireless device's global positioning system (GPS) data.

The base station 302 receives the activity data and inputs the activity data into an ML model 316. The ML model 316 can be located at the base station 302, on the core network of the telecommunication network, or at some other location away from the base station 302. The ML model 316 processes the activity data to determine a beamforming plan. Beamforming involves the strategic manipulation of the radiation pattern of an antenna array to enhance signal transmission and reception by shaping a beam transmitted from the base station 302. This technique optimizes the directionality of the signal, focusing energy toward specific wireless devices or areas while minimizing interference and signal loss in other directions. By dynamically adjusting the phase and amplitude of the signals at each antenna element, beamforming improves the overall network performance, increases data throughput, and enhances the quality of service. The beamforming plan includes a direction to direct the main lobe of the beam, a time period to transmit the beam, the beamforming method to use to transmit the beam, and/or a network slice to transmit the beam on. For example, the beamforming plan can direct the base station 302 to generate a beam in the direction of where a wireless device is typically located at a given time on a premium network slice. The beamforming plan can also indicate that the base station should use zero-forcing beamforming methods, narrowband beamforming, wideband beamforming, etc. The beamforming plan can be unique to each wireless device connected to the base station and be based on the specific activity data generated by the wireless device. The ML model 316 can be trained with historical activity data to generate the beamforming plan. The historical activity data can include data related to how a wireless device has historically (e.g., previously) interacted with the telecommunication network and historical location data of the wireless device. The ML model 316 is trained on historical location data from the wireless device so the ML model 316 can better determine when and where to transmit each beam and to better determine which network slice to use.

The beamforming plan is received by the base station 302. The beamforming plan can indicate that the base station should use zero-forcing beamforming methods to transmit a first beam 318 on a first network slice toward the first wireless device 308 and a second beam 320 toward the second wireless device 314. In some embodiments, the beamforming plan indicates a beam on a network slice should be directed based on a network traffic type or toward a certain general geographic area instead of directing the beam toward a specific wireless device. The first beam 318 includes a main lobe 304 and multiple side lobes **306*a*, 306*b*. The main lobe 304 provides telecommunication services to the first wireless device 308. The system can use zero-forcing beamforming methods to reduce the size of the multiple side lobes 306*a*, 306*b*. Additionally, the system can use zero-forcing beamforming methods to adjust the width of the main lobe 304 to narrow or sharpen the main lobe 304 to better direct the main lobe 304 toward the first wireless device 308. Because the first wireless device 308 is associated with a premium subscription, the base station 302 can use more network resources to provide telecommunication services to the first wireless device 308 when compared to the second wireless device 314. Using beamforming methods enables the telecommunication network to provide increased services to premium subscribers more effectively, such as increasing available bandwidth, increasing bandwidth speeds, and/or lowering latency. To provide more resources to the first wireless device 308, the system can reduce the resources available to the second wireless device 314, which can lower the quality of services available to the second wireless device 314**. Reducing the quality of services can cause a lower amount of available bandwidth or reduce the bandwidth speeds.

When there are enough resources to generate beams for wireless devices associated with standard subscribers, the system generates a second beam 320. The second beam 320 is generated on a second network slice different from the first network slice used for the first beam 318. The second beam 320 includes a main lobe 310 and side lobes 312*a*, 312*b*. The main lobe 310 provides telecommunication services to the second wireless device 314. The system can use zero-forcing beamforming methods to adjust the width of the main lobe 310. The system can also use zero-forcing beamforming methods to reduce the side of the side lobes 312*a*, 312*b*. Beam 320 can be configured to provide the second wireless device 314 with a lower level of telecommunication services when compared to those services provided to the first wireless device 308.

In some embodiments, the system is able to automatically update the direction of a beam on a network slice based on the movement of the first wireless device 308 and/or second wireless device 314. The system can determine how a beam should be updated based on historical activity data, such as historical location data and/or real-time activity data. The system receives real-time updates to the activity data from a wireless device that includes real-time location data. The ML model can track the movements of a wireless device and update the beamforming plan to redirect a beam toward the wireless device. The base station can constantly receive updates to the beamforming plan and update the direction of a beam to enable a wireless device to receive the proper telecommunication services.

The system helps enable the reduction of greenhouse gas emissions generated by the telecommunication network. Operation of the radio exposure function as disclosed herein causes a reduction in greenhouse gas emissions compared to traditional methods for network slicing. Every year, approximately 40 billion tons of $CO_2$ are emitted around the world. Power consumption by digital technologies including telecommunications networks account for approximately 4% of this figure. Further, conventional networks can sometimes exacerbate the causes of climate change. For example, the average U.S. power plant expends approximately 600 grams of carbon dioxide for every kWh generated. The implementations disclosed herein for operating the radio exposure function can mitigate climate change by reducing and/or preventing additional greenhouse gas emissions into the atmosphere. Moreover, in the U.S., datacenters are responsible for approximately 2% of the country's electricity use, while globally they account for approximately 200 terawatt Hours (TWh). Transferring 1 GB of data can produce approximately 3 kg of $CO_2$. Each GB of data downloaded thus results in approximately 3 kg of $CO_2$ emissions or other greenhouse gas emissions. The storage of 100 GB of data in the cloud every year produces approximately 0.2 tons of $CO_2$ or other greenhouse gas emissions. For example, the use of the ML model to determine the direction and duration of the beam reduces electrical power consumption and the amount of data transported and stored compared to traditional methods of transmitting telecommunications networks in all directions or transmitting a beam to a location with no wireless devices. Therefore, the system reduces the amount of greenhouse gas emissions generated by the telecommunication network by reducing the amount of data transmitted that is not used by any wireless device or subscriber.

Figure 4:
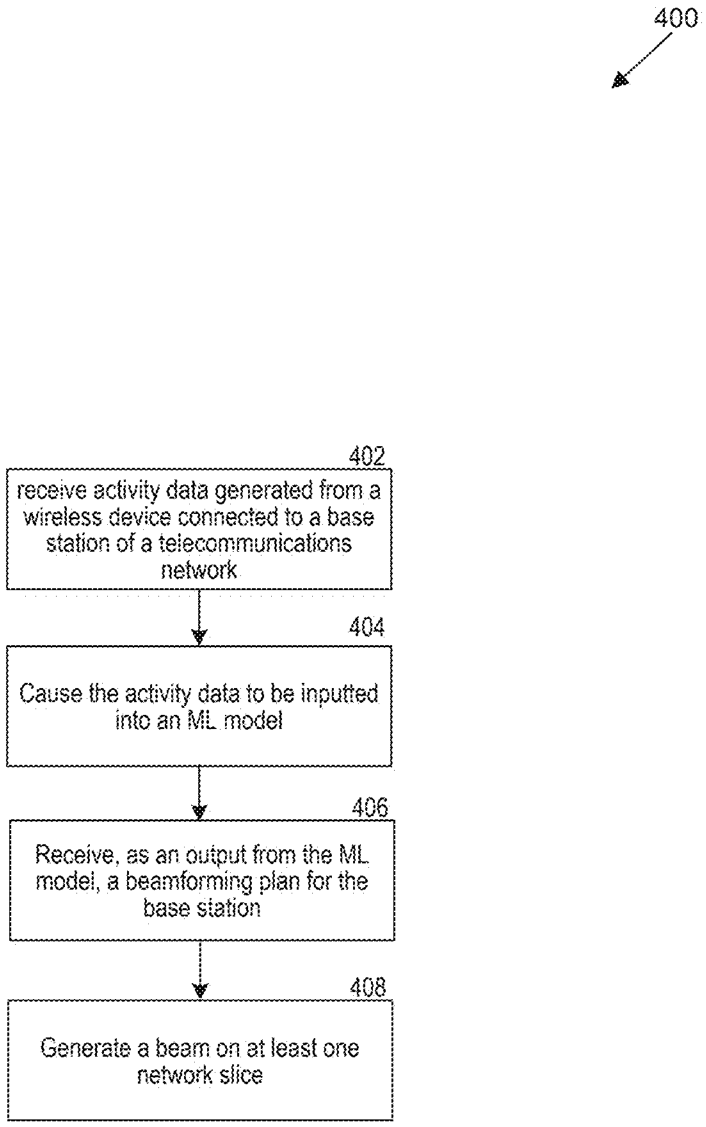
FIG. 4 is a flow diagram that illustrates an embodiment of the system.

FIG. 4 is a flow diagram that illustrates an embodiment of the system. In one example, the system includes at least one hardware processor and at least one non-transitory memory storing instructions, which, when executed by the at least one hardware processor, cause the system to perform the process 400.

At 402, the system receives real-time activity data generated from a wireless device connected to a base station of a telecommunication network. The activity data includes an account status of a subscriber, subscriber traffic type, or service type. The account status of the subscriber is classified as a premium subscriber or a standard subscriber. At 404, the system causes the activity data to be inputted into a machine learning (ML) model. In some embodiments, the system receives historical activity data for the wireless device from the base station. The historical activity data includes historical subscriber traffic type, historical service type, or historical location data of the wireless device. The system trains the ML model on the historical activity data. In some other embodiments, the ML model is located at the base station. In yet some other embodiments, the ML model is located on a core node of the telecommunication network.

At 406, the system receives, as an output from the ML model, a beamforming plan for the base station. The beamforming plan includes a direction to transmit a beam, a time period to transmit the beam, and at least one network slice on which to transmit the beam. At 408, the system generates the beam on the at least one network slice in accordance with the beamforming plan. In some embodiments, when the wireless device is associated with an account status classified as a premium subscriber, the system can cause activity data of a second wireless device connected to the base station to be inputted into the ML model, where the second wireless device is associated with an account status classified as a standard subscriber. The system can receive a second beamforming plan for the second wireless device. The system can generate a second beam on a different network slice for the second wireless device, where the beam supplies higher bandwidth speeds or lower latency compared to the second beam on the second network slice. In some other embodiments, the system receives an updated beamforming plan based on the wireless device moving to a location outside of a range of the beam and implements the updated beamforming plan. In some embodiments, the system causes the base station to use a zero-forcing beamforming method to generate the beam and reduces, using the zero-forcing beamforming method, a side lobe of the beam. In yet some other embodiments, the system reduces, using the zero-forcing beamforming method, a horizontal width of a main lobe of the beam, where reducing the width of the main lobe reduces interference from other wireless devices. In yet some other embodiments, the system prevents the base station from transmitting a wireless signal in all directions on the at least one network slice and reduces an amount of greenhouse gases by using a lower amount of resources to direct the beam toward the wireless device.

In another example, the system receives, from a base station of a telecommunication network, activity data generated from a wireless device connected to the base station, inputs the activity data into a machine learning (ML) model, generates, as an output from the ML model, a beamforming plan for the base station, and causes the base station to generate at least one beam on a network slice based on the beamforming plan. In some embodiments, the system can further receive, from the base station, activity data generated from a second wireless device connected to the base station, generate, as a second output from the ML model, a second beamforming plan for the base station, and cause the base station to generate a second beam based on the second beamforming plan on a second network slice. In some other embodiments, the system can further generate an updated beamforming plan based on the wireless device moving to a new location outside of a range of the beam and cause the base station to adjust the direction in which the beam is transmitted based on the new location. In yet some other embodiments, the system can cause the base station to use a zero-forcing beamforming method to generate the beam, reduce, using the zero-forcing beamforming method, a side lobe of the beam, and reduce, using the zero-forcing beamforming method, a horizontal width of a main lobe of the beam. Reducing the width of the main lobe reduces interference from other wireless devices.

Machine Learning Model

Figure 5:
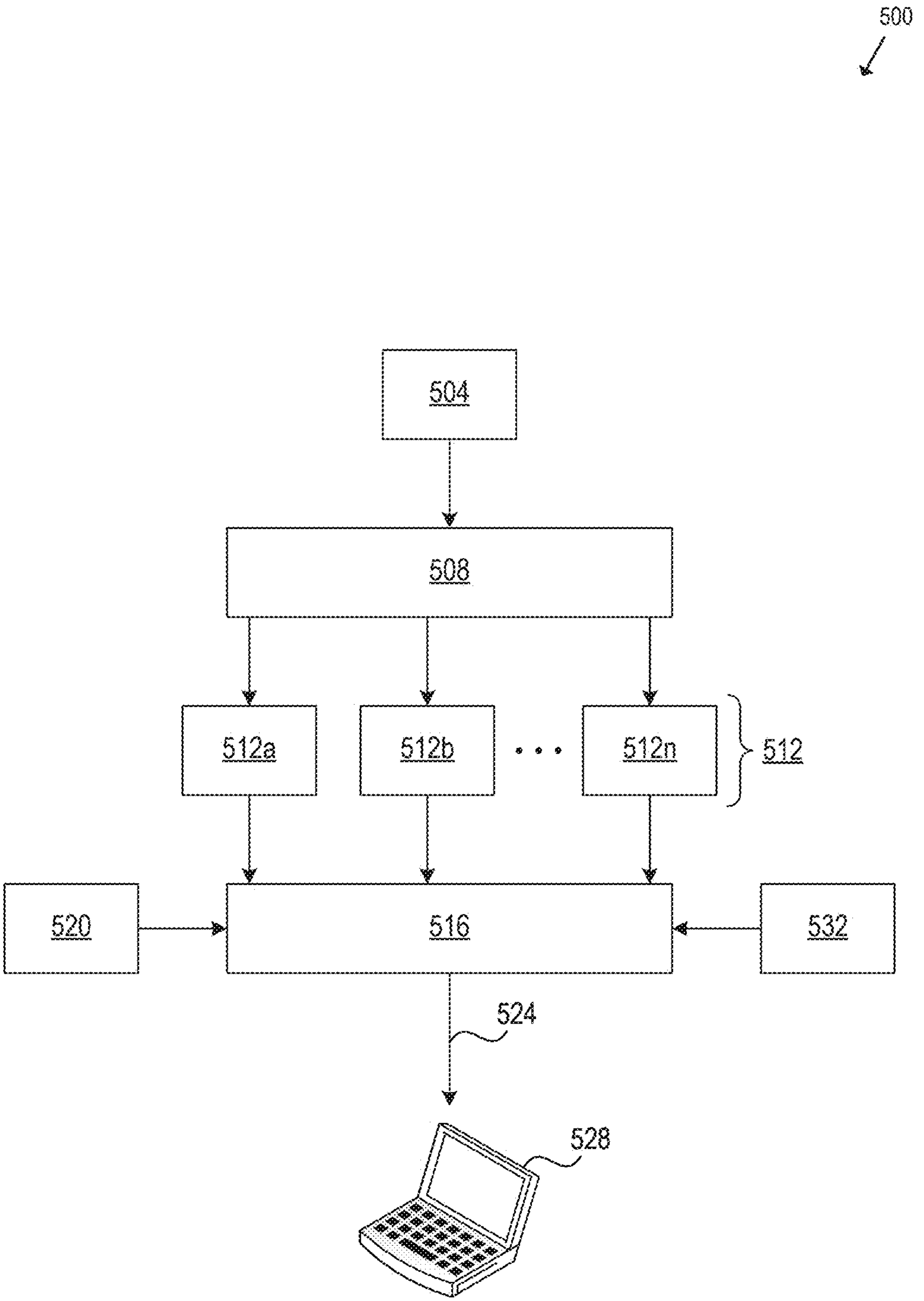
FIG. 5 is a block diagram illustrating an example machine learning (ML) system in accordance with one or more embodiments.

FIG. 5 is a block diagram illustrating an example ML system 500 in accordance with one or more embodiments. Likewise, different embodiments of the ML system 500 include different and/or additional components and are connected in different ways. The ML system 500 is sometimes referred to as an ML module.

The ML system 500 includes a feature extraction module 508 implemented using components of the example computer system 600 illustrated and described in more detail with reference to FIG. 6. In some embodiments, the feature extraction module 508 extracts a feature vector 512 from input data 504. The feature vector 512 includes features 512*a*, 512*b*, . . . , 512*n*. The feature extraction module 508 reduces the redundancy in the input data 504, for example, repetitive data values, to transform the input data 504 into the reduced set of features 512, for example, features 512*a*, 512*b*, . . . , 512*n*. The feature vector 512 contains the relevant information from the input data 504, such that events or data value thresholds of interest are identified by the ML model 516 by using a reduced representation. In some example embodiments, the following dimensionality reduction techniques are used by the feature extraction module 508: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 516 performs deep learning (also known as deep structured learning or hierarchical learning) directly on the input data 504 to learn data representations, as opposed to using task-specific algorithms. In deep learning, no explicit feature extraction is performed; the features 512 are implicitly extracted by the ML system 500. For example, the ML model 516 uses a cascade of multiple layers of nonlinear processing units for implicit feature extraction and transformation. Each successive layer uses the output from the previous layer as input. The ML model 516 thus learns in supervised (e.g., classification) and/or unsupervised (e.g., pattern analysis) modes. The ML model 516 learns multiple levels of representations that correspond to different levels of abstraction, wherein the different levels form a hierarchy of concepts. The multiple levels of representation configure the ML model 516 to differentiate features of interest from background features.

In alternative example embodiments, the ML model 516, for example, in the form of a convolutional neural network (CNN), generates the output 524, without the need for feature extraction, directly from the input data 504. The output 524 is provided to the computer device 528. The computer device 528 is a server, computer, tablet, smartphone, smart speaker, etc., implemented using components of the example computer system 600 illustrated and described in more detail with reference to FIG. 6. In some embodiments, the steps performed by the ML system 500 are stored in memory on the computer device 528 for execution. In other embodiments, the output 524 is displayed on an electronic display of the computer device 528.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field is approximated mathematically by a convolution operation. CNNs are based on biological processes and are variations of multilayer perceptrons designed to use minimal amounts of preprocessing.

In embodiments, the ML model 516 is a CNN that includes both convolutional layers and max pooling layers. For example, the architecture of the ML model 516 is "fully convolutional," which means that variable-sized sensor data vectors are fed into it. For convolutional layers, the ML model 516 specifies a kernel size, a stride of the convolution, and an amount of zero padding applied to the input of that layer. For the pooling layers, the ML model 516 specifies the kernel size and stride of the pooling.

In some embodiments, the ML system 500 trains the ML model 516, based on the training data 520, to correlate the feature vector 512 to expected outputs in the training data 520. As part of the training of the ML model 516, the ML system 500 forms a training set of features and training labels by identifying a positive training set of features that have been determined to have a desired property in question and, in some embodiments, forms a negative training set of features that lack the property in question.

The ML system 500 applies ML techniques to train the ML model 516 that, when applied to the feature vector 512, outputs indications of whether the feature vector 512 has an associated desired property or properties, such as a probability that the feature vector 512 has a particular Boolean property, or an estimated value of a scalar property. In embodiments, the ML system 500 further applies dimensionality reduction (e.g., via linear discriminant analysis (LDA), PCA, or the like) to reduce the amount of data in the feature vector 512 to a smaller, more representative set of data.

In embodiments, the ML system 500 uses supervised ML to train the ML model 516, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 532 is formed of additional features, other than those in the training data 520, which have already been determined to have or to lack the property in question. The ML system 500 applies the trained ML model 516 to the features of the validation set 532 to quantify the accuracy of the ML model 516. Common metrics applied in accuracy measurement include Precision and Recall, where Precision refers to a number of results the ML model 516 correctly predicted out of the total it predicted and Recall is a number of results the ML model 516 correctly predicted out of the total number of features that had the desired property in question. In some embodiments, the ML system 500 iteratively retrains the ML model 516 until the occurrence of a stopping condition, such as the accuracy measurement indication that the ML model 516 is sufficiently accurate, or a number of training rounds have taken place. In embodiments, the validation set 532 includes data corresponding to confirmed locations, dates, times, activities, or combinations thereof. This allows the detected values to be validated using the validation set 532. The validation set 532 is generated based on the analysis to be performed.

Computer System

Figure 6:
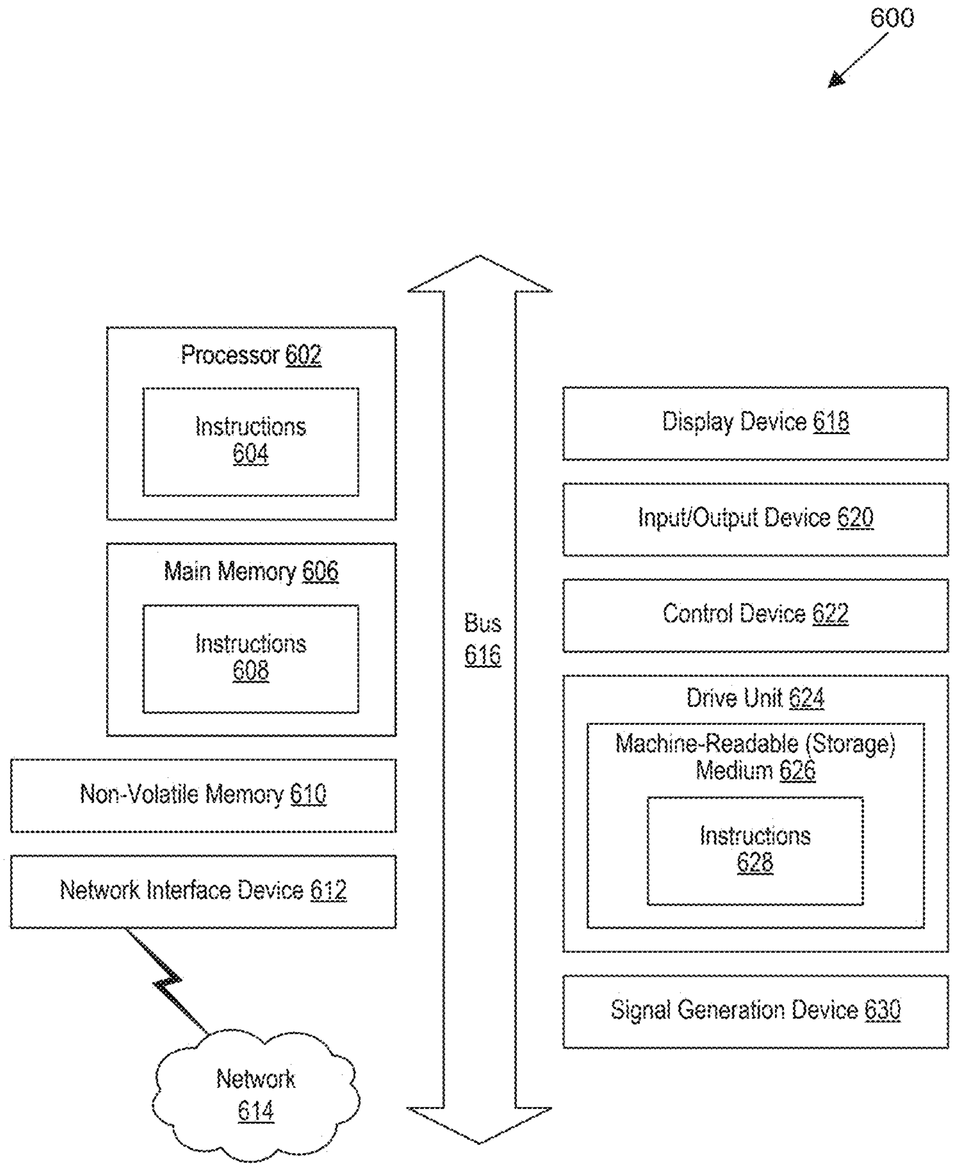
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

receive activity data generated from a wireless device connected to a base station of a telecommunication network, wherein the activity data includes an account status of a subscriber, subscriber traffic type, or service type, and wherein the account status of the subscriber is classified as a premium subscriber or a standard subscriber;

cause the activity data to be inputted into a machine learning (ML) model;

receive, as an output from the ML model, a beamforming plan for the base station, wherein the beamforming plan includes a direction to transmit a beam, a time period to transmit the beam, and at least one network slice on which to transmit the beam; and generate the beam on the at least one network slice in accordance with the beamforming plan.

2. The non-transitory, computer-readable storage medium of claim 1, wherein the wireless device is associated with an account status classified as a premium subscriber, and wherein the system is further caused to:

cause activity data of a second wireless device connected to the base station to be inputted into the ML model, wherein the second wireless device is associated with an account status classified as a standard subscriber;

receive a second beamforming plan for the second wireless device; and generate a second beam on a different network slice for the second wireless device, wherein the beam supplies higher bandwidth speeds or lower latency compared to the second beam on the different network slice.

3. The non-transitory, computer-readable storage medium of claim 1, wherein the system is further caused to:

receive an updated beamforming plan based on the wireless device moving to a location outside of a range of the beam; and implement the updated beamforming plan.

4. The non-transitory, computer-readable storage medium of claim 1, wherein the system is further caused to:

receive historical activity data for the wireless device from the base station, wherein the historical activity data includes historical subscriber traffic type, historical service type, or historical location data of the wireless device; and train the ML model on the historical activity data.

5. The non-transitory, computer-readable storage medium of claim 1, wherein the ML model is located at the base station.

6. The non-transitory, computer-readable storage medium of claim 1, wherein the ML model is located on a core node of the telecommunication network.

7. The non-transitory, computer-readable storage medium of claim 1, wherein the system is further caused to:

cause the base station to use a zero-forcing beamforming method to generate the beam; and reduce, using the zero-forcing beamforming method, a side lobe of the beam.

8. The non-transitory, computer-readable storage medium of claim 7, wherein the system is further caused to:
reduce, using the zero-forcing beamforming method, a horizontal width of a main lobe of the beam,
wherein reducing the width of the main lobe reduces interference from other wireless devices.

9. The non-transitory, computer-readable storage medium of claim 1, wherein the system is further caused to:
prevent the base station from transmitting a wireless signal in all directions on the at least one network slice; and
reduce an amount of greenhouse gases by using a lower amount of resources to direct the beam toward the wireless device.

10. A system comprising:
at least one hardware processor; and
at least one non-transitory memory storing instructions, which, when executed by the at least one hardware processor, cause the system to:
receive, from a base station of a telecommunication network, activity data generated from a wireless device connected to the base station,
wherein the activity data includes a network traffic type generated by the wireless device;
input the activity data into a machine learning (ML) model;
generate, as an output from the ML model, a beamforming plan for the base station,
wherein the beamforming plan includes a direction to transmit a beam, a time period to transmit the beam, and at least one network slice to transmit the beam on; and
cause the base station to generate at least one beam on a network slice based on the beamforming plan.

11. The system of claim 10, further caused to:
receive, from the base station, activity data generated from a second wireless device connected to the base station;
generate, as a second output from the ML model, a second beamforming plan for the base station; and
cause the base station to generate a second beam based on the second beamforming plan on a second network slice.

12. The system of claim 10, further caused to:
generate an updated beamforming plan based on the wireless device moving to a new location outside of a range of the beam; and
cause the base station to adjust the direction in which the beam is transmitted based on the new location.

13. The system of claim 10, further caused to:
cause the base station to use a zero-forcing beamforming method to generate the beam; and
reduce, using the zero-forcing beamforming method, a side lobe of the beam.

14. The system of claim 13, further caused to:
reduce, using the zero-forcing beamforming method, a horizontal width of a main lobe of the beam,
wherein reducing the width of the main lobe reduces interference from other wireless devices.

15. A method comprising:
receiving real-time activity data generated from a wireless device connected to a base station of a telecommunication network,
wherein the activity data includes an account status of a subscriber, subscriber traffic type, or service type;
causing the activity data to be inputted into a machine learning (ML) model;
receiving, as an output from the ML model, a beamforming plan for the base station,
wherein the beamforming plan includes a direction to transmit a beam, a time period to transmit the beam, and at least one network slice on which to transmit the beam; and
generating the beam on the at least one network slice in accordance with the beamforming plan.

16. The method of claim 15, further comprising:
causing activity data of a second wireless device connected to the base station to be inputted into the ML model;
receiving a second beamforming plan for the second wireless device; and
generating a second beam on a different network slice for the second wireless device,
wherein the beam supplies different bandwidth speeds or latency compared to the second beam on the second network slice.

17. The method of claim 15, further comprising:
receiving an updated beamforming plan based on the wireless device moving to a location outside of a range of the beam; and
adjusting the direction in which the beam is transmitted based on the updated beamforming plan.

18. The method of claim 15, further comprising:
receiving historical activity data for the wireless device from the base station,
wherein the historical activity data includes historical subscriber traffic type, historical service type, or historical location data of the wireless device; and
causing the ML model to be trained on the historical activity data.

19. The method of claim 15, further comprising:
causing the base station to use a zero-forcing beamforming method to generate the beam; and
reducing, using the zero-forcing beamforming method, a side lobe of the beam.

20. The method of claim 19, further comprising:
reducing, using the zero-forcing beamforming method, a horizontal width of a main lobe of the beam,
wherein reducing the width of the main lobe reduces interference from other wireless devices.

* * * * *